April 9, 1957 H. E. MICHAEL 2,788,184
AUXILIARY AIR INLET DOOR AND DUCT COUPLING
FOR JET AIRCRAFT AIR INLET DUCTS
Filed Oct. 5, 1953 2 Sheets-Sheet 1
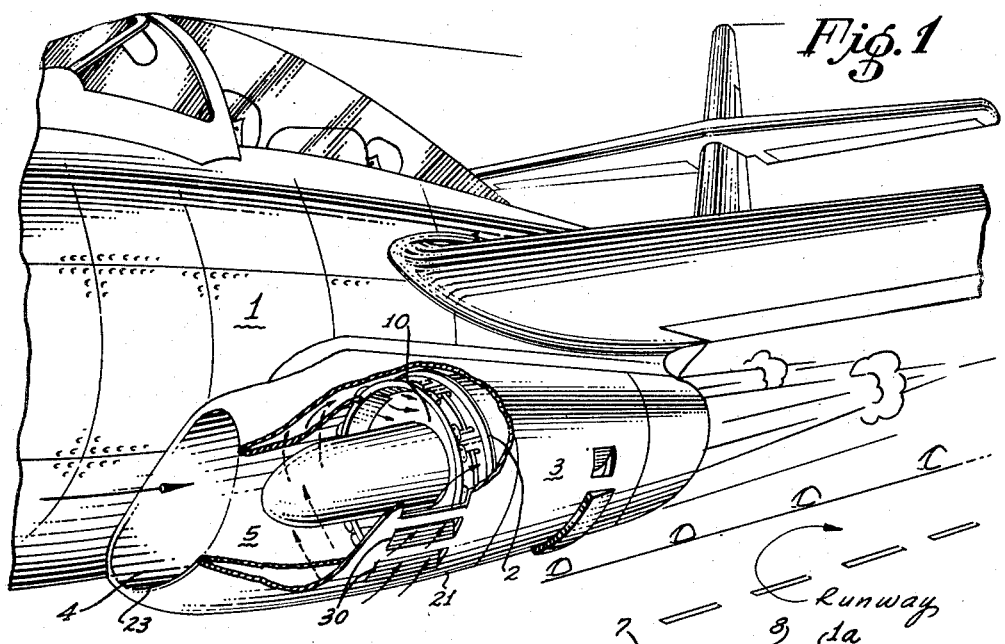
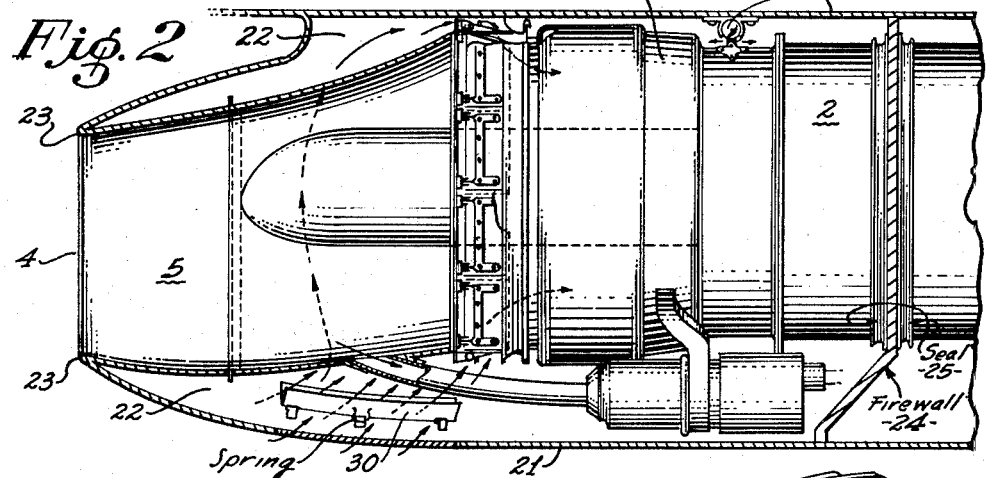
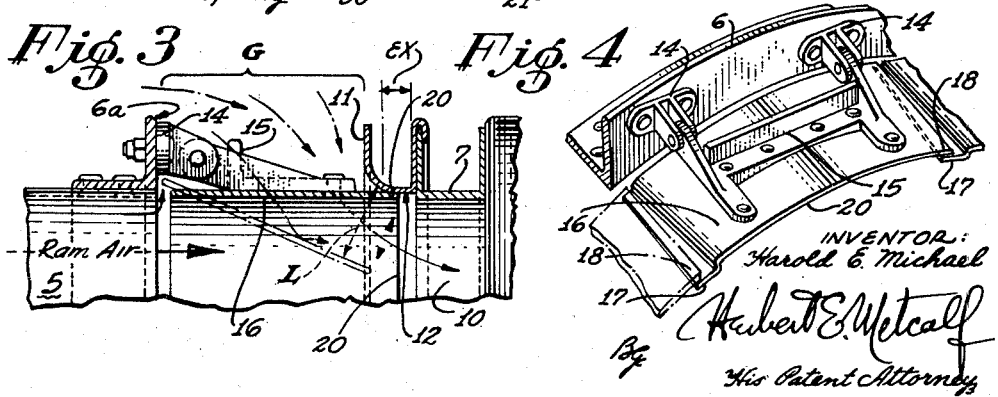
INVENTOR:
Harold E. Michael
By Hubert E. Metcalf
His Patent Attorney INVENTOR:
Harold E. Michael
By Herbert E. Metcalf
His Patent Attorney United States Patent Office 2,788,184
Patented Apr. 9, 1957

2,788,184

AUXILIARY AIR INLET DOOR AND DUCT COUPLING FOR JET AIRCRAFT AIR INLET DUCTS

Harold E. Michael, Hawthorne, Calif., assignor to Northrop Aircraft, Inc., Hawthorne, Calif., a corporation of California Application October 5, 1953, Serial No. 383,951

6 Claims. (Cl. 244—53)

The present invention relates to air inlets for gaseous combustion turbines installed in airplanes, and more particularly to a means for decreasing the inlet pressure loss in air inlets for such engines during airplane take-off. The present invention is an improvement of the device shown, described and claimed in an application for U. S. patent, Serial No. 123,466, filed October 25, 1949, now Patent No. 2,699,906.

In high speed airplanes utilizing engines of the gaseous combustion type, particularly those airplanes powered by gas turbines taking their compressor inlet air from the side of the fuselage, or the leading edge of a wing, the air inlets are relatively small, and usually have sharp, thin duct lips. Such inlet construction is highly desirable during cruising and high speed flight because of the consequent decreased frontal area and drag, and increased critical Mach number. At standstill or take-off, however, the performance of the gas turbines is impaired because of high unit airflow per unit inlet area, with the benefit of little or no ram pressure. In view of the desirable qualities of small engine air inlets and sharp, thin duct lips, it was found beneficial to provide a means of improving take-off performance which did not require increasing the normal inlet area or a change in duct lip contour.

In addition, jet engines are usually quite long and extend well ahead of the thrust connections to the airplane. This extension is usually long enough so that the compressor end of the engine moves longitudinally forwardly a substantial distance when brought up to maximum temperature from a cold condition. This movement can be accommodated by providing a gap between the forward end of the engine and the inboard end of the ram air inlet duct, this gap usually bridged by some resilient material permitting free longitudinal expansion and contraction of the engine with respect to the opposed outlet of the ram air inlet duct. However, I have found that this gap, using special closures in accordance with the present invention, can be efficiently utilized for the admission of auxiliary air before ram pressure develops in the air inlet duct during flight.

Among the objects of the present invention are:

To provide a novel means for reducing pressure loss in inlets for gas turbine engines used in airplanes, at low airplane speeds.

To provide an additional inlet area for gas turbine engine inlets in airplanes to reduce pressure losses on airplane take-off.

To provide an automatic means of regulating air intake area for gas turbine engines during airplane take-off.

To provide a means in an airplane for utilizing a gap between the forward end of a jet engine and the rear end of an air inlet duct to admit auxiliary air which at the same time provides for engine contraction and elongation.

To provide means for closing the gap required to accommodate jet engine expansion and elongation when installed in an airplane, said closure means being capable of use as an auxiliary air inlet in any engine position.

And to provide a novel means connecting the forward end of a jet engine with the rear end of a ram air inlet duct to said engine in an airplane.

In most high speed airplanes equipped with gas turbine engines, a negative pressure is created inside the engine air inlet ducts due to the pressure losses in the inlet, when the airplane is standing still or moving slowly. This condition creates a loss in take-off power, which loss can be greatly reduced by admitting auxiliary air to the compressor through an auxiliary air inlet adjacent the compressor inlet, under the control of doors operated by the differential pressure existing between the compressor inlet and the atmosphere. The doors open when a negative pressure exists in the ram air inlet duct, and close when a positive pressure is built up in the air inlet duct due to ram developed in full flight.

The present invention utilizes a construction providing a gap entirely around the compressor inlet between a member on that inlet and a member on the opposed inboard end of the ram air inlet duct of the airplane. The compressor end of the engine and the opposed inboard end of the ram air inlet duct are so spaced that a substantial gap will always exist therebetween at the maximum longitudinal expansion of the engine. Peripheral closures are then provided for the gap, hinged on one member to swing inwardly and slidably engageable with the other member, so that the engine is free to expand and contract longitudinally irrespective of the position of the peripheral gap closures.

Auxiliary air is made available for passage through the gap when a negative pressure is developed at the compressor inlet, by providing doors in the outer skin of the airplane or engine nacelle adjacent the gap, and then sealing the space between the gap and the doors so that the doors, which are preferably spring loaded to remain normally closed, are also opened by the negative pressure developed in the space. Thus an efficient auxiliary air inlet is provided all around the compressor inlet, with perfect freedom of longitudinal movement of that inlet under various engine operating conditions.

The invention can be better understood by reference to the following description of a preferred embodiment of the invention as shown in the drawings in which:

Figure 1 is a perspective view from one side of part of an airplane utilizing said preferred embodiment, a part of an engine nacelle being in a cutaway sectional view for additional clarity.

Figure 2 is a longitudinal sectional view of the ram air inlet duct and fore portion of a jet engine as mounted in the nacelle shown in Figure 1.

Figure 3 is an enlarged detailed sectional view of a gap closure.

Figure 4 is a perspective view from outside, of a gap closure.

Figure 5:
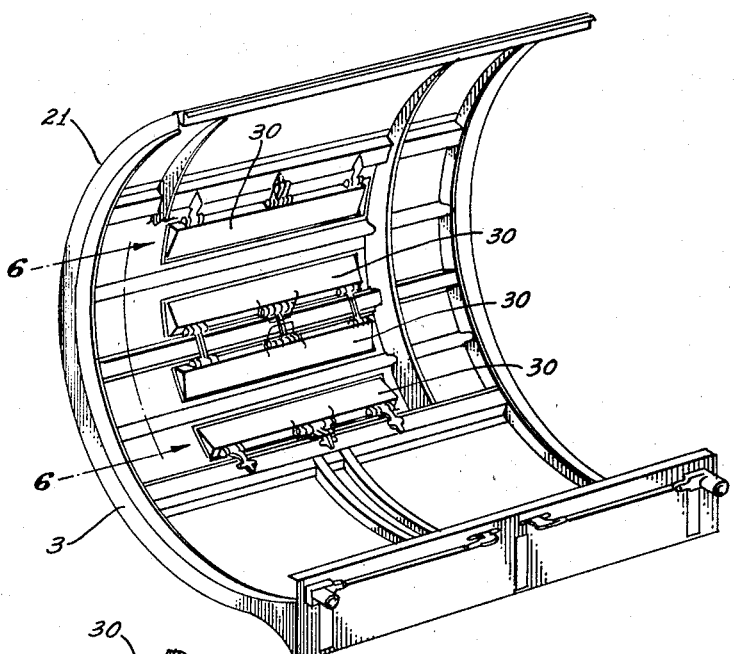
Figure 5 is a perspective view from the inside, of the skin inlet doors.
Figure 6:
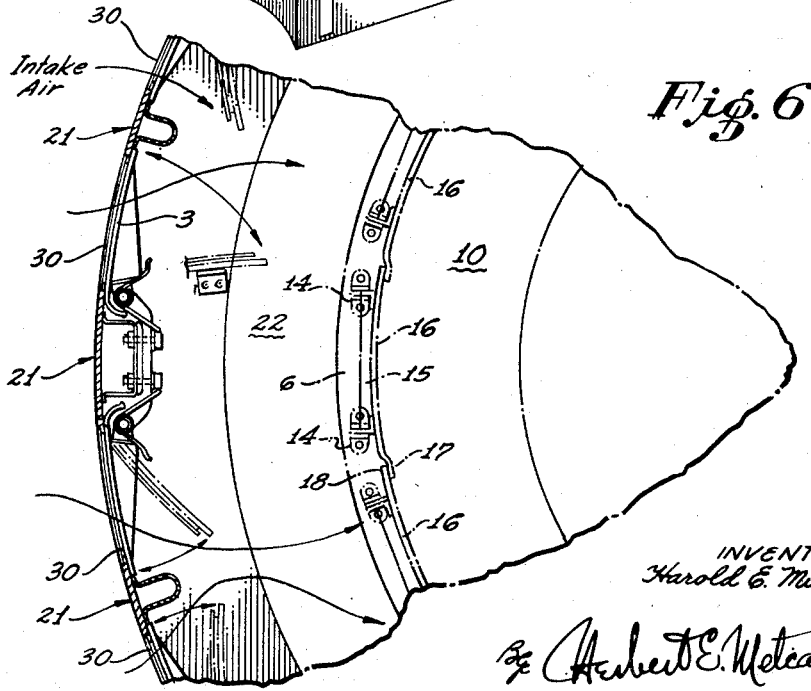
Figure 6 is a cross sectional view taken as indicated by the line 6—6 in Figure 5.

Referring first to Figure 1, an airplane 1 is driven by two jet engines, one of which 2 is shown mounted in a lateral engine nacelle 3. A ram air inlet 4 is provided at the forward end of the nacelle 3, leading into a ram air inlet duct 5 directed rearwardly and terminating at a peripheral inboard end flange 6, best shown in Figures 3 and 4.

The jet engine 2 is mounted on a thrust bracket (not shown) rearwardly of engine compressor section 7 of the engine 2, the engine being positioned horizontally by the use of a hinged ball and socket bracket 8 attached between the top of the compressor section 7 and the adjacent airframe 1a.

The forward end of the engine is therefore free to move longitudinally as the engine changes temperature in operation.

The compressor inlet 10 is provided with a forwardly and outwardly extending flange 11 this flange having an inner peripheral closure bearing surface 12 (Figure 3).

Compressor inlet flange 11 is spaced away from inboard end flange 6 of the ram air inlet duct 5 to provide a gap G between said flanges, this gap for example, when a 5000 lb. static thrust jet engine is installed, being preferably on the order of several inches at all times.

At intervals around the rear face 6a of the inboard end flange 6, are positioned pairs of hinge brackets 14 extending rearwardly. Each pair of hinge brackets has hinged thereto a closure bracket 15 attached to a closure 16. Closures 16 are cylindrical segments, and each is provided with a side offset 17 overlapping the adjacent edge 18 of the next closure, as best shown in Figure 4.

The closures are longer than the extent of the gap, and the rear edges 20 of the closures ride on the closure bearing surface 12 of the compressor inlet 10 at all compressor inlet positions. Consequently, the closures can only open inwardly as indicated by the broken line L in Figure 3. Bearing surface 12 is made long enough to provide for the entire possible expansion distance Ex, as also shown in Figure 3. A sufficient number of closures are provided to pass around and completely close gap G.

The outer skin 21 of the airplane nacelle is adjacent the gap G, and is spaced therefrom to form an auxiliary air space 22, this space being closed in front by lip 23 of the ram air inlet duct 5 and at the rear by a firewall 24, the latter peripherally contacting the engine 2 at a sliding seal 25 as shown in Figure 2. Thus negative pressure at the compressor inlet 10 pumps out space 22 to substantially the same negative pressure as at the inlet.

Auxiliary air is admitted to space 22 through a plurality of auxiliary air doors 30, spring loaded to remain normally closed, flush with the remainder of the nacelle skin.

These doors can open under a negative pressure in space 22 to admit air thereto. It has not been found necessary in practice to spring load closures 16 to normally stay in closed position, although there is no objection to such positioning, as development of a negative pressure at the compressor air inlet as the engine starts immediately causes the closures to open.

As the closures 16 open, space 22 is pumped out, and doors 30 open, thus providing adequate air for the compressor when the airplane is standing, or at a speed where substantial ram pressure is absent from the ram air inlet duct 5.

As the airplane increases speed, as in a take-off, ram pressure develops in the compressor inlet duct 5, reversing the air flow through closures 16, closing them. Negative pressure disappears from the space 22, thereby permitting doors 30 to close in accordance with the spring urge applied thereto. Thus in flight all air goes to the engine through the ram air inlet duct 5.

Due to the substantial overlap of the closures 16 on the bearing surface 12 of the compressor inlet flange 11, front end of the engine is free to move longitudinally, even though the closures 16 are closed, as the rear edges 20 of the latter are free to slide over the bearing surface 12.

Thus the closures 16 not only act as auxiliary air inlets prior to and during take-off, but also act as engine to inlet duct seals in flight.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In an airplane driven by a gas turbine engine comprising a compressor and having a compressor air inlet opening at one end of said engine; an air duct in said airplane having an outlet opening opposed to and adjacent said compressor air inlet opening, means for supporting said engine to permit axial thermal expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening under all operating conditions, and segmental closure means hingedly attached around the periphery of said outlet opening and opening inwardly, said closure means when closed slidably contacting the interior rim of said compressor air inlet opening to permit expansion and contraction of said engine in any engine position.

2. In an airplane driven by a gas turbine engine comprising a compressor and having a compressor air inlet opening at one end of said engine; an air duct in said airplane having an outlet opening opposed to and adjacent said compressor air inlet opening, means for supporting said engine to permit axial thermal expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening under all operating conditions, and segmental closure means hingedly attached around the entire periphery of said outlet opening and opening inwardly, said closure means when closed slidably contacting the interior rim of said compressor air inlet opening to permit expansion and contraction of said engine in any engine position.

3. A gas turbine engine comprising a compressor and having a compressor air inlet opening at one end of said engine, an air inlet duct having an outlet opening opposed to and adjacent but spaced forward of said compressor air inlet opening and completely free therefrom to provide a gap between said air inlet duct outlet opening and said compressor air inlet opening, means for connecting the exterior of said gap to a source of substantially static pressure, and closure means operable solely by the pressure differential on each side of said gap to open and close said gap, said closure means when closed slidably contacting the rim of said compressor air inlet opening to permit expansion and contraction of said engine in any position of said closure means.

4. In an airplane driven by a gas turbine engine comprising a compressor and having a compressor air inlet opening at one end of said engine; an air duct in said airplane having an outlet opening opposed to and adjacent said compressor air inlet opening, means for supporting said engine to permit axial expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening under all operating conditions, and segmental closure means hingedly attached around the periphery of said outlet opening and opening inwardly, said closure means when closed slidably contacting the interior rim of said compressor air inlet opening to permit expansion and contraction of said engine when said closure means are closed.

5. In an airplane driven by a gaseous combustion turbine engine having a compressor and a compressor air inlet opening, combustors, turbine and jet exhaust therefrom, the improvement comprising means for supporting said engine in said airplane with said engine free to expand longitudinally and forwardly as said engine heats up in operation; a ram air inlet duct fixed to said airplane and having an air outlet opening opposed to and spaced from said compressor air inlet opening under all operating conditions, a plurality of segmental closures hingedly attached to the rim of one of said openings and opening inwardly, and having sufficient length to bridge the gap between said openings at the minimum forward expansion of said engine, said closures having a peripheral extent sufficient to close said gap when subjected to ram air pressure in said duct in any position of said engine, and means for conducting auxiliary air under relatively low pressure to the outside of said closures, whereby when a negative pressure exists in said air inlet duct, said doors will open to admit said auxiliary air directly into said compressor.

6. In an airplane driven by a gaseous combustion engine of the compressor-turbine type, the compressor of said engine having a forwardly facing compressor air inlet, a main air duct having a ram air inlet at one end and having at the other end an air outlet opposed to but spaced from said compressor air inlet to form a gap therebetween, gap closure means positioned around said gap and movable to close said gap by the action of and when a substantial ram air pressure is developed in said main air duct during flight of said airplane, an auxiliary air inlet in said airplane substantially closer to said compressor air inlet than said ram air inlet and subject to substantially no ram air pressure when said airplane is in flight, means conducting air from said auxiliary air inlet around said gap outside of the closures therefor, and an inlet closure for said auxiliary air inlet, said latter closure being spring loaded to normally remain closed, said latter closure being openable solely by negative pressure developed at said compressor inlet through open gap closure means when said engine is running in the absence of substantial ram air pressure in said main air duct.

References Cited in the file of this patent
UNITED STATES PATENTS

| | | |
|---|---|---|
| 2,604,278 | Johnson | July 22, 1952 |
| 2,631,796 | Williamson | Mar. 17, 1953 |